(12) United States Patent
Jones

(10) Patent No.: US 7,237,630 B2
(45) Date of Patent: Jul. 3, 2007

(54) STEERING ARRANGEMENT FOR A WORK MACHINE

(75) Inventor: Kenneth G. Jones, Buffalo, MN (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 11/210,233

(22) Filed: Aug. 23, 2005

(65) Prior Publication Data

US 2006/0004503 A1    Jan. 5, 2006

Related U.S. Application Data

(63) Continuation of application No. 10/420,328, filed on Apr. 22, 2003, now abandoned.

(51) Int. Cl.
*B60K 17/30* (2006.01)
(52) U.S. Cl. .................................... 180/6.48
(58) Field of Classification Search ......... 180/6.2–6.48
See application file for complete search history.

(56) References Cited

U.S. PATENT DOCUMENTS

| 2,737,021 A | 3/1956 | Edge et al. |
| 4,147,227 A | 4/1979 | Van Der Lely |
| 4,771,846 A | 9/1988 | Venable et al. |
| 4,837,567 A | 6/1989 | Kleefeldt et al. |
| 4,846,581 A | 7/1989 | Osterlund et al. |
| 5,071,163 A | 12/1991 | Heinrichs et al. |
| 5,086,862 A | 2/1992 | Graber et al. |
| 5,176,368 A | 1/1993 | Shtarkman |
| 5,373,911 A | 12/1994 | Yasui |
| 5,517,096 A | 5/1996 | Shtarkman et al. |
| 5,749,431 A | 5/1998 | Peterson |
| 5,803,202 A | 9/1998 | Bohner et al. |
| 6,000,490 A | 12/1999 | Easton |
| 6,070,686 A | 6/2000 | Pollmann |
| 6,279,952 B1 | 8/2001 | Van Wynsberghe et al. |
| 6,389,343 B1 | 5/2002 | Hefner et al. |

FOREIGN PATENT DOCUMENTS

| JP | 58-8466 | 1/1983 |
| JP | 58-195642 | 11/1983 |

*Primary Examiner*—Kevin Hurley
(74) *Attorney, Agent, or Firm*—Liell & McNeil; Jeffrey A. Greene

(57) ABSTRACT

A steering arrangement is provided for a work machine that includes a braking device, actuated by an actuation switch, to hold an operator input device in a predetermined position during operation. The braking force of the braking device can be overcome by the operator to make steering adjustments. The work machine may include a second steering arrangement on an opposite side of the work machine to improve operator visibility during close operation. A selector switch is used to select between one or the other steering arrangements.

12 Claims, 3 Drawing Sheets

STEERING ARRANGEMENT FOR A WORK MACHINE

RELATION TO OTHER PATENT APPLICATION

This application is a continuation of patent application Ser. No. 10/420,328, filed Apr. 22, 2003, now abandoned with the same title, now abandoned.

TECHNICAL FIELD

The present invention relates generally to a steering arrangement, and more particularly to a steering device with a spring return and position locking arrangement.

BACKGROUND

Steering arrangements not having a mechanical connection between the steering wheel and the ground engaging support members are commonly known in work machines. These known arrangements accept steering input commands from the operator through the use of a lever, joystick, steering wheel, or other input device. The steering input commands are transformed to an electric signal that is then transmitted to a controller that sends an electronic signal, responsive to the magnitude of the steering command, to a pump, valve, motor or other mechanical device to turn wheels, speed or slow tracks to actually perform the turning operation.

One example of such a steering apparatus is disclosed in U.S. Pat. No. 4,771,846 issued on Sep. 20, 1988 to Fredrick Venable et al. and is assigned to TRW, Inc. This patent shows a steering system for controlling a vehicle with steerable wheels. The system includes a steering wheel having a steering sensor attached thereto. A signal representative of a desired turning command is transferred from the sensor to a controller. The controller in turn delivers a signal to a hydraulic control valve that controls the flow of fluid to a hydraulic motor that is in turn connected to the steerable wheels.

This steering system also provides the operator with a steering feedback/feel that is provided by an electromagnetic friction brake. The controller in response to a steering wheel position sensor and a steered wheel position sensor controls the electromagnetic brake. The amount of friction force created by the electromagnetic brake depends upon and is limited by the strength of the electromagnet. However this patent is directed towards automobiles that travel at much higher speeds that require constant operator intervention. The patent is also absent any way of dealing with operator fatigue and multi-tasking that an operator of a work machine faces during operation of such a machine.

The present invention is directed to overcoming one or more of the problems as set forth above.

SUMMARY OF THE INVENTION

In one aspect of the present invention a steering arrangement is provided for a work machine. The work machine includes at least two ground engaging support members positioned on opposite sides of the work machine. A steering motor is connected to each of the ground engaging support members. Each steering motor operatively propels and steers the ground engaging support members in response to a control signal. The steering arrangement includes a support member and a steering input device movable relative to the support member. A biasing mechanism is positioned between the support member and the steering input device. A sensor is positioned to sense the position of said input device and produces an electrical signal indicative of the position. An electromagnetic brake is connected to the input device and the support. A switch is connected to the electromagnetic brake.

DETAILED DESCRIPTION

Figure 1:
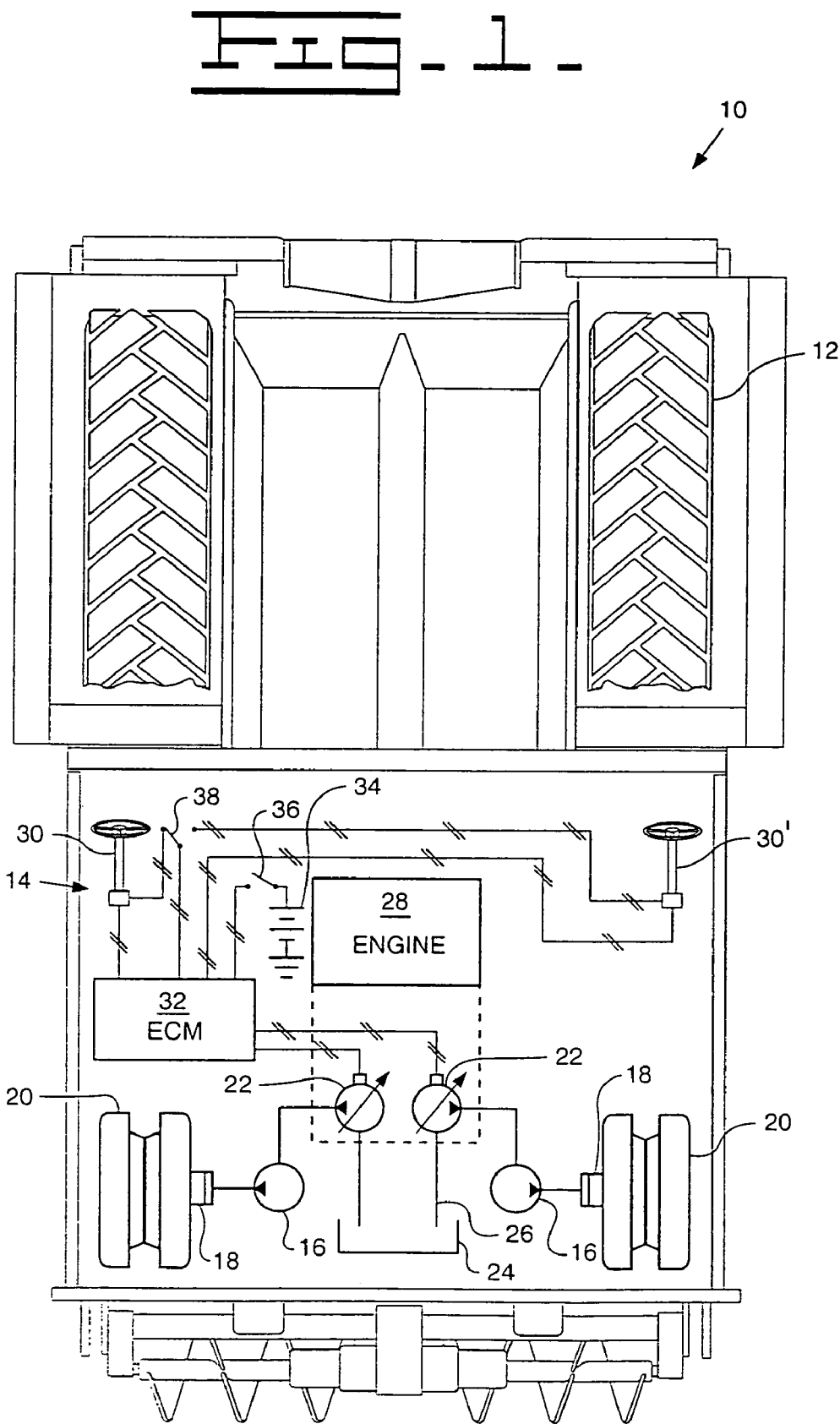
FIG. 1 is a schematic representation of a work machine embodying the present invention.

Referring now to the drawings and particularly to FIG. 1, a work machine 10 such as an asphalt paver is shown having at least two ground engaging support members 12 one each positioned on opposite sides thereof. The ground engaging support members 12 are shown as being tracks, however wheels, rubber belts or other suitable support members 12 would work equally as well.

A steering system 14 for the work machine 10 is shown and includes a steering motor 16 connected with each of the ground engaging support members 12 for supplying power thereto. Steering motors 16 are shown as being fixed displacement fluid motors but alternatively may be electric motors and still function in a similar manner. Each steering motor 16 is connected to a multi-speed planetary gear arrangement 18 having a drive wheel 20 that directly operatively engages one of the ground engaging support members 12. The multi-speed planetary gear arrangements 18 allow for at least two speed ranges such as roading and paving. Individual propel pumps 22 supply operative power to a respective steering motor 16. The propel pumps 22 are shown for example as being variable displacement pumps but could be other known devices that would supply a variable amount of power output, such as electrical generators, to propel work machine 10. In the example shown in FIG. 1 the propel pumps 22 are connected to and draw fluid from and are connected to a fluid reservoir 24 via conduits 26. An engine 28 is operatively connected to the propel pumps 22 in a known manner.

A steering arrangement 30 is connected to an electric control module 32. The steering arrangement 30 supplies a steering signal responsive to the magnitude and direction of an operator steering input request to the electric control module 32 as will be described below. Control module 32 is connected and sends electrical signals to each of the propel pumps 22. The control module 32 in turn, supplies a steering output command signal to each of the propel pumps 22 that is responsive to the magnitude and direction of the desired input request from the operator.

Steering direction is thus controlled by actuation of the propel pumps 22. The steering rate and direction is proportional to the amount of fluid flow supplied to and from the steering motors 16, which are controlled by controlling the displacement of the respective propel pumps 22. The propel pumps 22 are responsive to the magnitude of the signal from control module 32 being outputted to the pumps 22. For example, if a right hand turn is desired the propel pump 22 that supplies pressurized fluid to the right steering motor 16 reduces output and the propel pump 22 that supplies pressurized fluid to the left steering motor 16 increases output respectively in response to the magnitude of the turn request. Thus speeding the rotation of the left hand support member 12 and slowing the rotation of the right hand support member 12 to maneuver the desired right hand turn.

The control module 32 receives operating power from a battery 34 through an ignition switch 36 when the ignition switch 36 is placed in a closed/run position. The work machine 10 may include an additional steering arrangement 30'. The additional steering arrangement 30' is connected to the control module 32 in the same manner as steering arrangement 30 and allows the operator to sit on either side of the work machine 10 during operation and still retain steering control of the work machine 10 while working close to curbs bridge railings and the like. A selector switch 38 positioned on the operator control panel (not shown) is used to select between steering arrangement 30 or steering arrangement 30'. In this example, the term selector switch 38 means any of a number of known switching devices that may be used to select between steering arrangement 30 and steering arrangement 30'. Steering arrangement 30' is substantially operatively and structurally similar to steering arrangement 30 and therefore only steering arrangement 30 will be described in detail.

Figure 2:
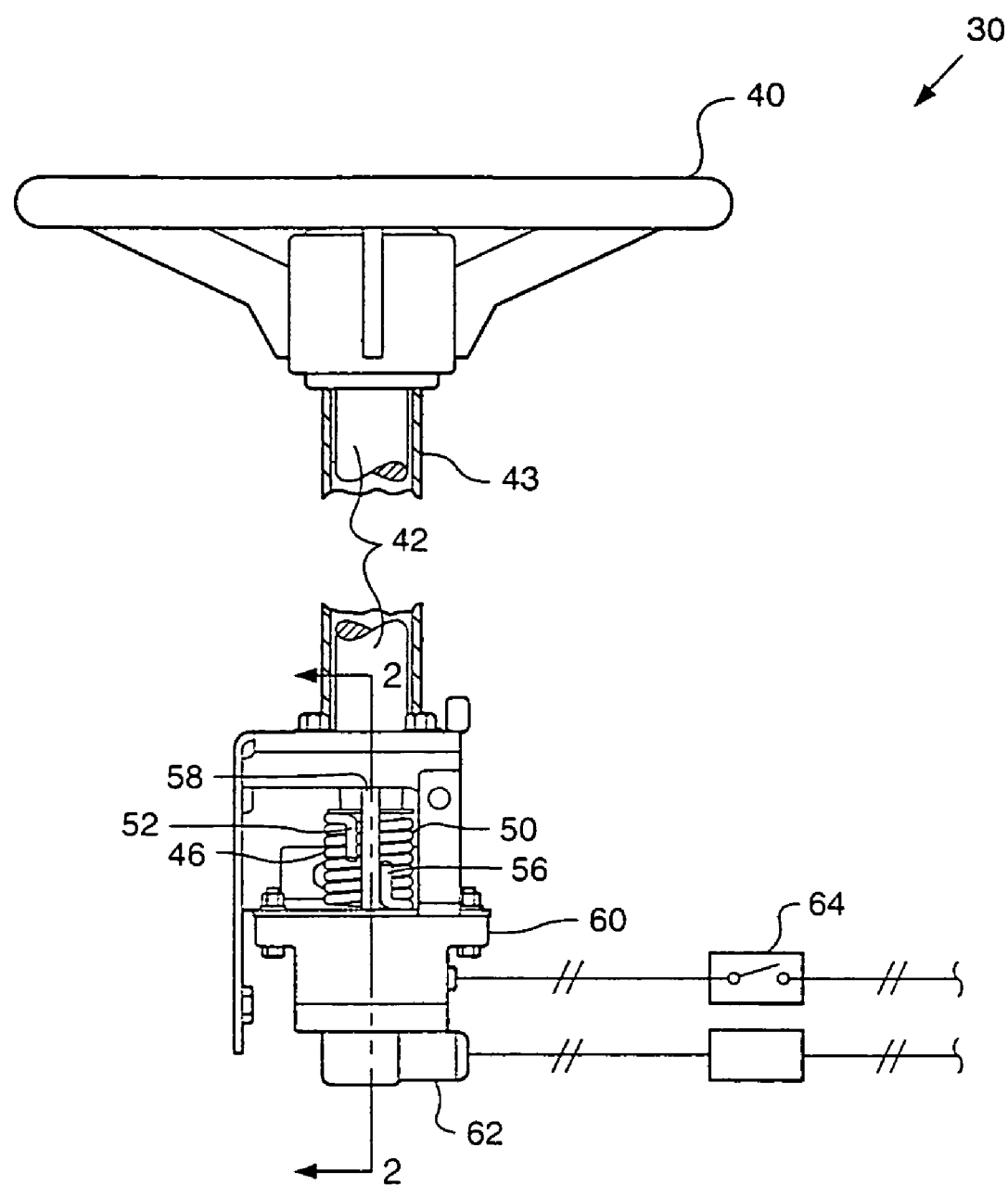
FIG. 2 is a schematic illustration of a steering arrangement embodying the present invention.
Figure 3:
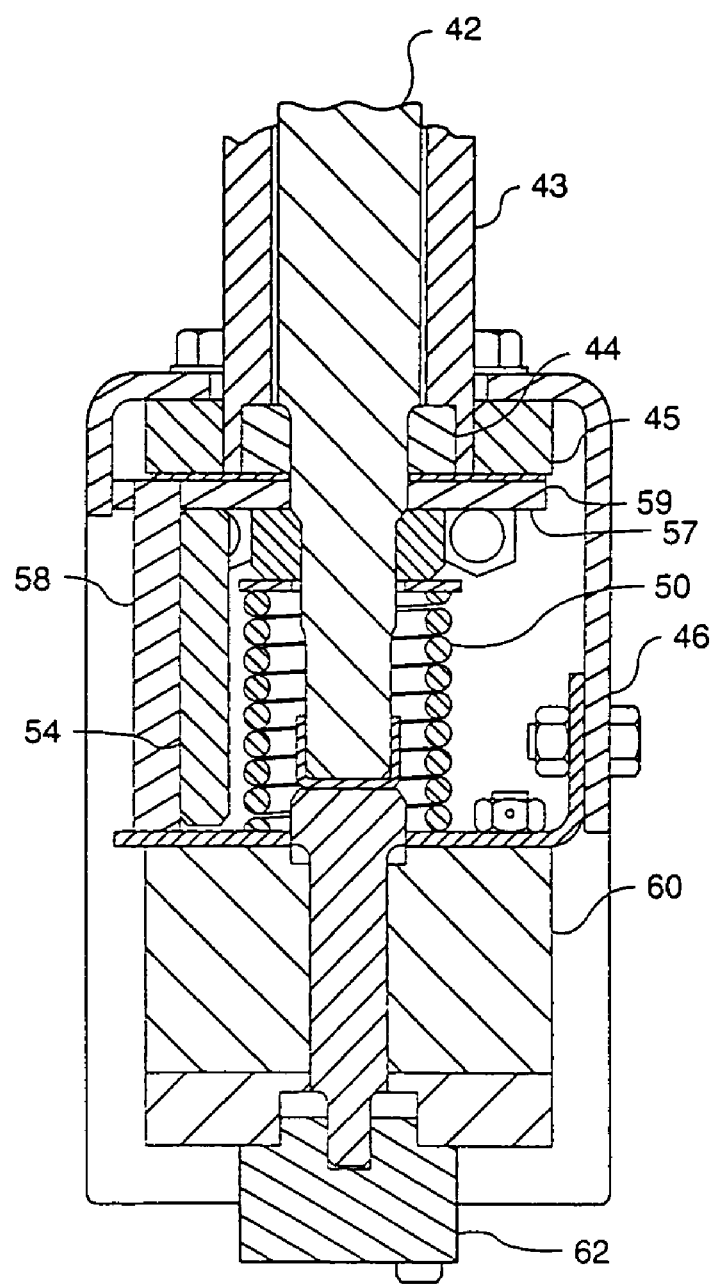
FIG. 3 is a sectional view of a portion of the steering system shown in FIG. 2.

Referring now to FIGS. 2 and 3 steering arrangement 30 includes an operator input device 40, which is for example a steering wheel, that is connected to one end of an input shaft 42. Input shaft 42 is positioned within a support tube 43 and rotatably supported at both ends by means of a pair of bearings/bushings 44 (only one shown in FIG. 3). Support tube 43 is connected to a stationary support 46 by a mounting plate 45 that holds one of the bearing/bushings 44 in the end of the support tube 43. Stationary support 46 includes a biasing mechanism 50 disposed about the input shaft 42 at the opposite end of the operator input device 40.

The biasing mechanism 50 includes a first abutting member 52 that is contacted by a post 54 when the operator input device 40 is rotated in a first direction. When the operator input device 40 is rotated in the first direction a second abutting member 56 makes contact with a stationary post 58. Post 54 is connected to a transition plate 57 that is operatively connected to the input shaft 42. While stationary post 58 is connected to the support 46. The second abutting member 56 of the biasing mechanism 50 also makes contact with post 54 when the operator device 40 is rotated in a second direction and the first abutting member 52 contacts stationary post 58. The outer circumferential surface 59 of the transition plate 57 also includes a pair of stops (not shown) that make contact with the stationary post 58 so as to only allow the operator input device 40 to rotate a predetermined amount. In this manner the biasing mechanism 50 causes the operator input device 40 to be self-centering when not being held and controlled by the operator.

Still referring to FIGS. 2 and 3, a braking device 60, which in this example is an electromagnetic brake but may be any of a number of braking arrangements, is operatively connected to input shaft 42 and the support 46. A position sensor 62 monitors the rotational position of the input shaft 42 relative to the support 44 and produces an electrical signal indicative thereof. Position sensor 62 is a rotary position senor that is connected to the end of the input shaft 42 and to the control module 32 as by cable/wire. Position sensor 62 sends an output signal to the control module 32 responsive to the magnitude and direction of the rotation of input shaft 42. The braking device 60 is controlled and connected to an activation switch 64. In this example, the term activation switch 64 means any of a number of known switches that may be used to energize the braking device 60 from fully off position to a position were the braking device 60 holds biasing mechanism 50 from causing the operator input device 40 to rotate bake to a centered position. Activation switch 64 may be positioned in an operator control panel (not shown) and when activated supplies a current to the braking device 60 having a force sufficient enough to hold the input shaft 42 in a stationary manner without allowing the biasing mechanism 50 to center the operator input device 40. However, the operator can overcome the braking force exerted by the braking device 60 during operation of the work machine 10 so as to make steering adjustments.

INDUSTRIAL APPLICABILITY

In operation, the steering arrangement 14 used on a work machine 10 such as an asphalt paver reduces operator fatigue and offers flexibility in several different ways. For example, if the work machine is operating in a straight-ahead operation or a slow curve, minimal operator input to the steering system 14 through the use of the operator input device 40 is required. During these types of operations the operator may choose to lock the steering arrangement 30 in a predetermined specific position. Closing the activation switch 64 energizes the braking device 60. The force exerted by the braking device 60 prevents the biasing mechanism 50 from returning the operator input device 40 to a centered position, thus holding the operator input device 40 in a stationary position relative to said support 46. As stated above, the force exerted by the braking device 60 is greater than the biasing mechanism 50, however, if steering adjustments are required the operator can reposition the input device 40 even with the braking device 60 energized. Thus, no change in signal from the position sensor 62 will be sent to the control module 32 unless the operator desires a steering correction.

The steering arrangement 14 also allows the operator to steer the work machine from either the left or right hand side of the work machine 10. When the selector switch 38 is positioned to allow control signals from the position sensor 62 of steering arrangement 30', the operator can be seated on the right hand side of the work machine 10. This allows the work machine 10 to be maneuvered close to obstacles such as curbing on the right side of the machine 10. When the work machine 10 is shut down at the end of operation and the ignition switch 36 is positioned in the off position, the braking 60 is de-energized. This prevents any inadvertent steering requests at the next work machine 10 start up.

What is claimed is:
1. A work machine comprising:
at least two ground engaging members;
a pair of steering motors, one each being connected to each of the ground engaging members;
a propel pump connected to each of the steering motors in response to a steering signal;
a first steering arrangement operably coupled to said propel pump and including:
a support;
a steering input device mounted for relative movement to said support; and
a braking device connected to said steering input device and said support for providing a braking force so as to prevent relative movement between said steering input device and said support.

2. The work machine of claim 1 including;
a second steering arrangement operably coupled to said propel pump and including;
a support;
a steering input device mounted for relative movement to said support; and
a braking device connected to said steering input device and said support for providing a braking force so as to prevent relative movement between said steering input device and said support.

3. The work machine of claim 2, including a selector switch connected to said first and said second steering arrangement.

4. The work machine if claim 3, wherein said selector switch allows signals from said first steering arrangement when said selector switch is in a first position and from said second steering arrangement when said selector switch is in a second position.

5. The work machine of claim 1, including a position sensor attached to, and positioned for monitoring the relative position of an input shaft of said steering input device and for producing an electrical signal indicative thereof.

6. The work machine of claim 1, including an activation switch being connected to said braking device.

7. The work machine of claim 6, wherein said activation switch is actuatable between a fully off position and a braking position.

8. The work machine of claim 7, wherein said braking force is greater than the force exerted by a biasing mechanism.

9. The work machine of claim 7 wherein said braking force can be overcome to make steering adjustments.

10. The work machine of claim 1 wherein
said steering input device is operably coupled to a self-centering biasing mechanism;
said braking device being operably coupled to overcome the self centering biasing mechanism to maintain the steering input device in an off center position; and
means for selectively activating or deactivating the braking device.

11. The work machine of claim 8 wherein the steering input device is a first steering input device located on one side of the work machine; and
a second steering input device located on an a side opposite to the one side.

12. The work machine of claim 8 wherein the work machine is an asphalt paver.

* * * * *